US012694283B2

(12) United States Patent (10) Patent No.: US 12,694,283 B2

Raje et al. (45) Date of Patent: Jul. 28, 2026

(54) ACCELERATING INFERENCE OF NEURAL NETWORK MODELS VIA DYNAMIC EARLY EXITS

(71) Applicant: International Business Machines Corporation, Armonk, NY (US)

(72) Inventors: Saurabh Manish Raje, Haryana (IN); Saurabh Goyal, New Delhi (IN); Anamitra Roy Choudhury, New Delhi (IN); Yogish Sabharwal, Haryana (IN); Ashish Verma, Nanuet, NY (US)

(73) Assignee: International Business Machines Corporation, Armonk, NY (US)

( * ) Notice: Subject to any disclaimer, the term of this patent is extended or adjusted under 35 U.S.C. 154(b) by 899 days.

(21) Appl. No.: 17/307,501

(22) Filed: May 4, 2021

(65) Prior Publication Data

US 2022/0358358 A1 Nov. 10, 2022

(51) Int. Cl.
*G06N 3/08* (2023.01)
*G06N 3/04* (2023.01)

(52) U.S. Cl.
CPC .............. *G06N 3/08* (2013.01); *G06N 3/04* (2013.01)

(58) Field of Classification Search
CPC ............. G06N 3/08; G06N 3/04; G06N 3/045
See application file for complete search history.

(56) References Cited

U.S. PATENT DOCUMENTS

| | | | |
|---|---|---|---|
| 7,895,506 B2 | 2/2011 | Bhora et al. | |
| 8,687,893 B2 | 4/2014 | Nowozin | |
| 9,437,186 B1 * | 9/2016 | Liu | G10L 15/22 |
| 9,692,450 B2 | 6/2017 | Khalil et al. | |
| 2019/0180168 A1 | 6/2019 | Barad et al. | |
| 2020/0202846 A1 * | 6/2020 | Bapna | G10L 15/1815 |
| 2020/0226461 A1 * | 7/2020 | Heinrich | G06N 3/08 |
| 2021/0056357 A1 * | 2/2021 | Zhang | G06K 9/6262 |
| 2021/0086353 A1 * | 3/2021 | Shah | G06N 3/008 |
| 2022/0309285 A1 * | 9/2022 | Shelhamer | G06K 9/6202 |

OTHER PUBLICATIONS

Teerapittayanon, Surat. "BranchyNet: Fast Inference via Early Exiting from Deep Neural Networks" (Year: 2016).*
Baccarelli, Enzo, et al. "Optimized training and scalable implementation of Conditional Deep Neural Networks with early exits for Fog-supported IoT applications." (Year: 2020).*

(Continued)

*Primary Examiner* — Michelle T Bechtold
*Assistant Examiner* — Matiyas T Maru
(74) *Attorney, Agent, or Firm* — Ryan, Mason & Lewis, LLP

(57) ABSTRACT

Methods, systems, and computer program products for accelerating inference of neural network models via dynamic early exits are provided herein. A computer-implemented method includes determining a plurality of candidate exit points of a neural network model; obtaining a plurality of outputs of the neural network model for data samples in a target dataset, wherein the plurality of outputs comprises early outputs of the neural network model from the plurality of candidate exit points and regular outputs of the neural network model; and a set of one or more exit points from the plurality of candidate exits points that are dependent on the target dataset based at least in part on the plurality of outputs.

20 Claims, 8 Drawing Sheets

(56)　　　　　References Cited

OTHER PUBLICATIONS

Scardapane, Simone, et al. "Why should we add early exits to neural networks?" (Year: 2020).*

Smith, et al., "A disciplined approach to neural network hyper-parameters: Part 1—learning rate, batch size, momentum, and weight decay." (Year: 2018).*

Kim, et al. "Compression of deep convolutional neural networks for fast and low power mobile applications.", (Year: 2015).*

Bolukbasi, et al., "Adaptive neural networks for efficient inference." International conference on machine learning. PMLR, (Year: 2017).*

Teerapittayanon, et al., "Branchynet: Fast inference via early exiting from deep neural networks." (Year: 2016).*

Liu, Weijie, et al. "Fastbert: a self-distilling bert with adaptive inference time." arXiv preprint arXiv:2004.02178 (2020).

Kin, Ji, et al. "Deebert: Dynamic early exiting for accelerating bert inference." arXiv preprint arXiv:2004.12993 (2020).

Teerapittayanon, Surat, Bradley McDanel, and Hsiang-Tsung Kung. "Branchynet: Fast inference via early exiting from deep neural networks." 2016 23rd International Conference on Pattern Recognition (ICPR). IEEE, 2016.

Song, Xu, Xiao-Jun Wu, and Hui Li. "MSDNet for medical image fusion." International conference on image and graphics. Springer, Cham, 2019.

Shafiee, Mohammad Saeed, Mohammad Javad Shafiee, and Alexander Wong. "Efficient inference on deep neural hetworks by dynamic representations and decision gates." (2018).

Figurnov, Michael, et al. "Spatially adaptive computation time for residual networks." Proceedings of the IEEE Conference on Computer Vision and Pattern Recognition. 2017.

Wang, Meiqi, et al. "DynExit: A Dynamic Early-Exit Strategy for Deep Residual Networks." 2019 IEEE International Workshop on Signal Processing Systems (SiPS). IEEE, 2019.

Zhou, Wangchunshu, et al. "Bert loses patience: Fast and robust inference with early exit." arXiv preprint arXiv:2006.04152 (2020).

Li, En, Zhi Zhou, and Xu Chen. "Edge intelligence: On-demand deep learning model co-inference with device-edge synergy." Proceedings of the 2018 Workshop on Mobile Edge Communications. 2018.

Barad, Haim, et al., Fast Inference with Early Exit, available at: https://www.intel.com/content/www/us/en/artificial-intelligence/posts/fast-inference-with-early-exit.html, last accessed May 4, 2021.

Mell, Peter, et al., The NIST Definition of Cloud Computing, National Institute of Standards and Technology, U.S. Department of Commerce, NIST Special Publication 800-145, Sep. 2011.

* cited by examiner

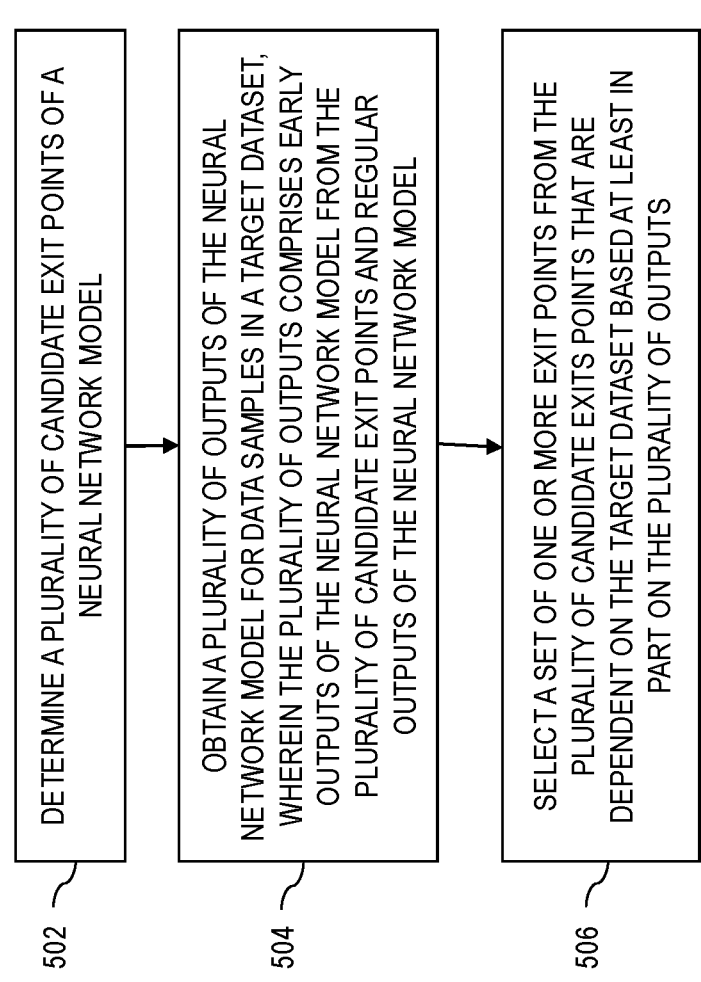

502 DETERMINE A PLURALITY OF CANDIDATE EXIT POINTS OF A NEURAL NETWORK MODEL

504 OBTAIN A PLURALITY OF OUTPUTS OF OUTPUTS OF THE NEURAL NETWORK MODEL FOR DATA SAMPLES IN A TARGET DATASET, WHEREIN THE PLURALITY OF OUTPUTS COMPRISES EARLY OUTPUTS OF THE NEURAL NETWORK MODEL FROM THE PLURALITY OF CANDIDATE EXIT POINTS AND REGULAR OUTPUTS OF THE NEURAL NETWORK MODEL

506 SELECT A SET OF ONE OR MORE EXIT POINTS FROM THE PLURALITY OF CANDIDATE EXITS POINTS THAT ARE DEPENDENT ON THE TARGET DATASET BASED AT LEAST IN PART ON THE PLURALITY OF OUTPUTS

FIG. 5

ACCELERATING INFERENCE OF NEURAL NETWORK MODELS VIA DYNAMIC EARLY EXITS

BACKGROUND

The present application generally relates to information technology and, more particularly, to neural network models.

Deep neural networks (DNNs) are used for a variety of applications including computer vision, speech recognition, and natural language processing, for example.

SUMMARY

In one embodiment of the present disclosure, techniques for accelerating inference of neural network models via dynamic early exits are provided. An exemplary computer-implemented method includes the steps of determining a plurality of candidate exit points of a neural network model; obtaining a plurality of outputs of the neural network model for data samples in a target dataset, wherein the plurality of outputs comprises early outputs of the neural network model from the plurality of candidate exit points and regular outputs of the neural network model; and selecting a set of one or more exit points from the plurality of candidate exits points that are dependent on the target dataset based at least in part on the plurality of outputs.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

BRIEF DESCRIPTION OF THE DRAWINGS

FIG. 5 is a flow diagram illustrating techniques in accordance with exemplary embodiments;

DETAILED DESCRIPTION

Neural network inference (such as DNN inference) is computationally expensive even when performed on the fastest hardware. For time critical applications, model compression techniques are generally required to build a practically useful system. For example, one technique includes performing an "early exit" from the model for appropriate data points (e.g., relatively easy data points). Typically, early exits are determined by attempting to exit at each layer of the DNN model or an arbitrary subset thereof. Such techniques rely on manual exit configurations and lack adaptivity to a target dataset.

As described herein, an exemplary embodiment includes dynamically selecting exits in a model (e.g., a DNN model) based at least in part on a target dataset to reduce inference time while maintaining control over the accuracy of the model. Such an embodiment may include dynamically selecting the exit point of a DNN model for a given input sample based at least in part on a target dataset and/or task, thereby increasing the inference efficiency (e.g., with respect to computation and memory usage). In at least one embodiment, selecting the exits may include computing a set of statistics for the target dataset based on the outputs of a given exit and those produced by the original model. The optimal set of exit points for the model may then be determined, along with thresholds per exit. The set of statistics may be generated using one or more of the following techniques, for example: KL Divergence, Cross Entropy, and the number of changes between the output at the exits and the output of the model for given samples.

Figure 1:
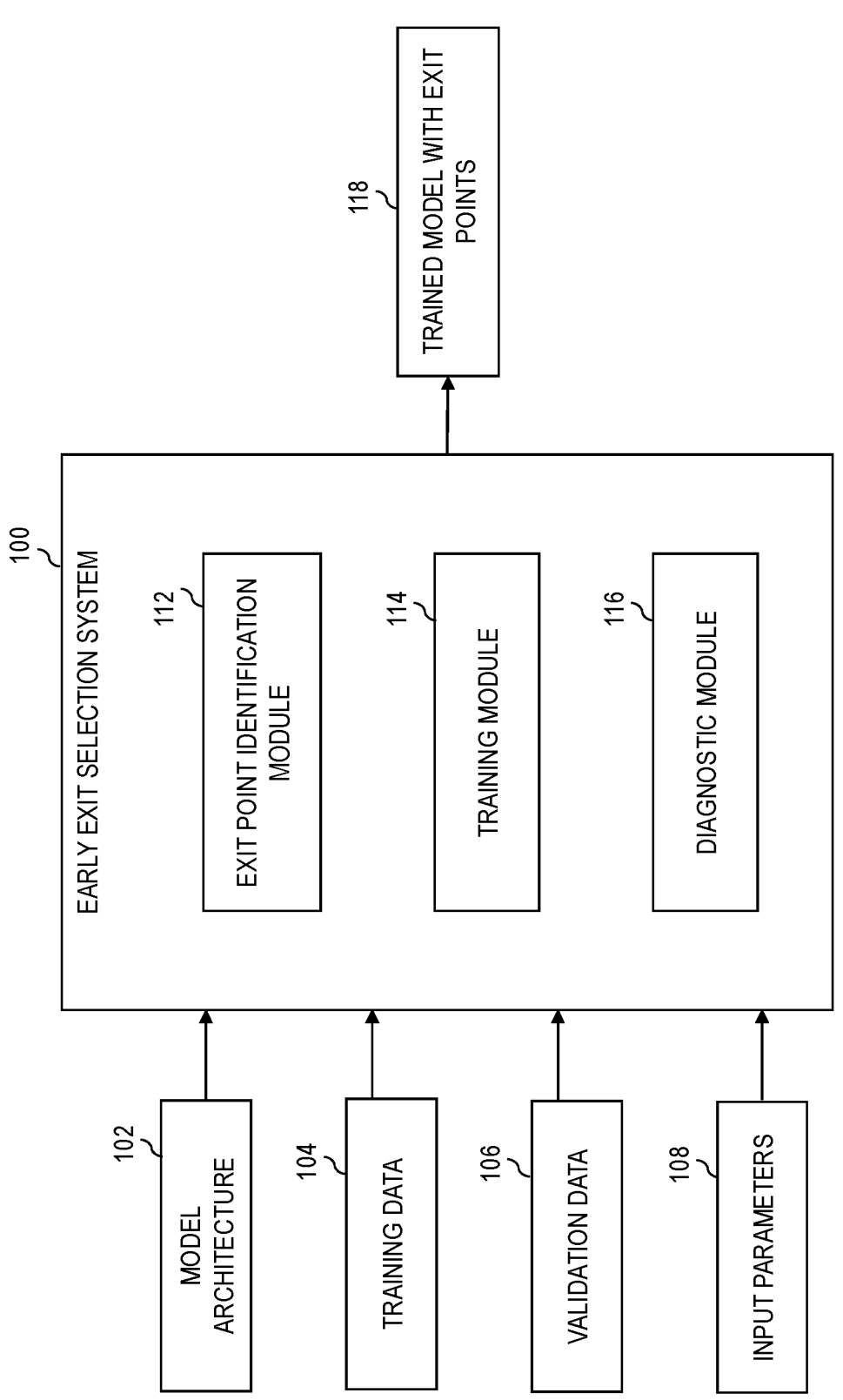
FIG. 1 is a diagram illustrating a system architecture in accordance with exemplary embodiments.

FIG. 1 is a diagram illustrating a system architecture in accordance with exemplary embodiments. By way of illustration, FIG. 1 depicts an early exit selection system 100 that obtains a model architecture 102, training data 104, validation data 106, and, optionally, one or more input parameters 108. In the FIG. 1 embodiment, the early exit selection system 100 includes an exit point identification module 112, a training module 114, and a diagnostic module 116. According to some example embodiments, the exit point identification module 112 defines exist-wise weighted log loss for the model architecture 102. The training module 114 uses a modified loss function to train the model architecture 102 over the training data 104. The training module 114 results in a trained model having one or more memory layers.

In one or more embodiments, the memory layers are used to keep track of the output of a data point at an early stage of network processing. These outputs are stored and later compared with the outputs produced by the last layer of the network. Such a comparison aids in the selection of the optimal exits for a given network. The memory layer hence creates a what-if scenario of the sample exiting early at a given stage in the network.

The diagnostic module 116 uses validation data 106 to obtain outputs at the exit points and compares them to the original output of the model (e.g., output when an exit point is not used). In some examples, the training data 104 and the validation data 106 are different datasets related to a same task (e.g., language processing task, classification task, etc.), and the validation data 106 is used to select the optimal exits out of the memory layers.

The diagnostic module 116 may also obtain one or more input parameters 108 such as, for example, a number of exits to be used in the final neural network model, constraints on a placement of exits, a threshold change in accuracy of the neural network model, and one or more computing constraints. The diagnostic module 116 then outputs a trained model with exit points 118 that are strategically placed for a target dataset.

As such, aspects of the present disclosure can determine possible set of exit points for a given model and a target dataset (and task), and for each data sample, determines the exit point for that sample so that the overall test prediction time is while controlling or minimizing the loss in accuracy. Accordingly, data dependent early exits are placed along the model such that relatively easy data samples do not have to go through every layer in the model, and the model is configured to identify which samples are easy during inference.

Figure 2:
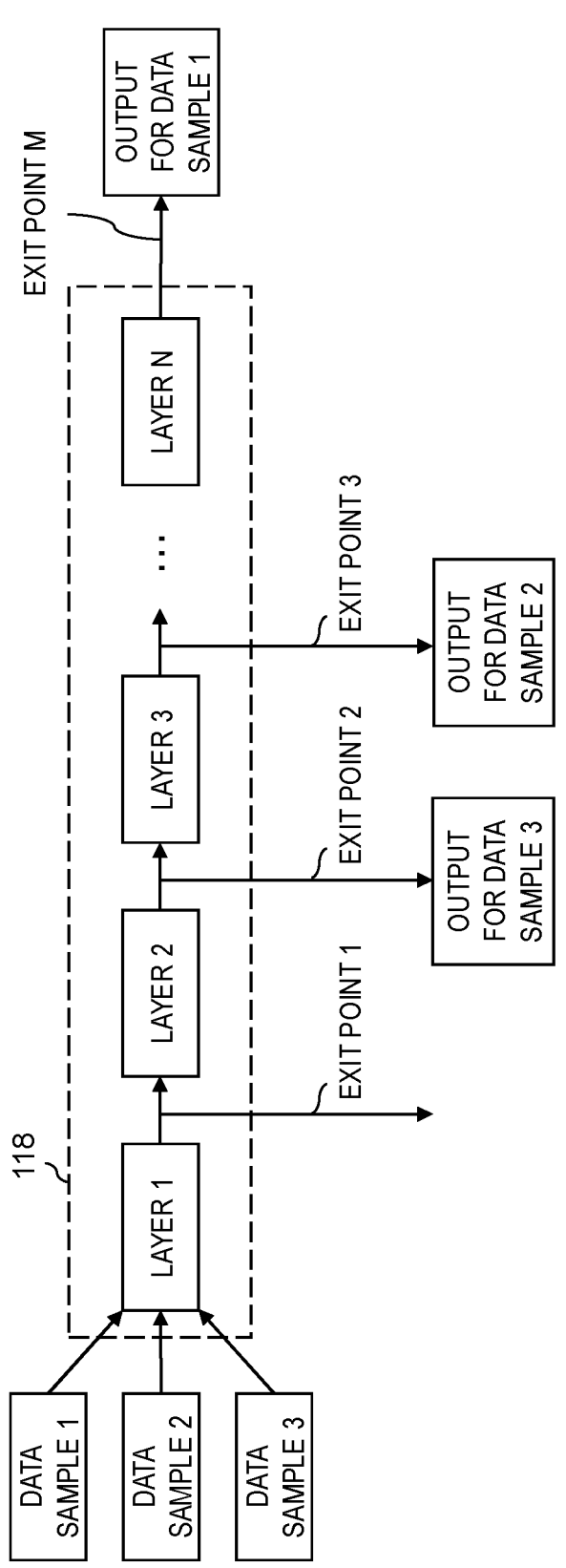
FIG. 2 is a diagram illustrating a model using early exits in accordance with exemplary embodiments.

FIG. 2 is a diagram illustrating a model (such as trained model with exit points 118) in accordance with exemplary embodiments. In the example shown in FIG. 2, the model includes a number, N, of layers, and a number, M, of exit points. The model 118 is provided three data samples (data samples 1-3) as input, and the model 118 selects the appropriate (e.g., optimal) exit point for each of the data samples 1-3. For example, in FIG. 2, the model 118 selects exit point 2 for data sample 3 and exit point 3 for data sample 2.

Figure 3:
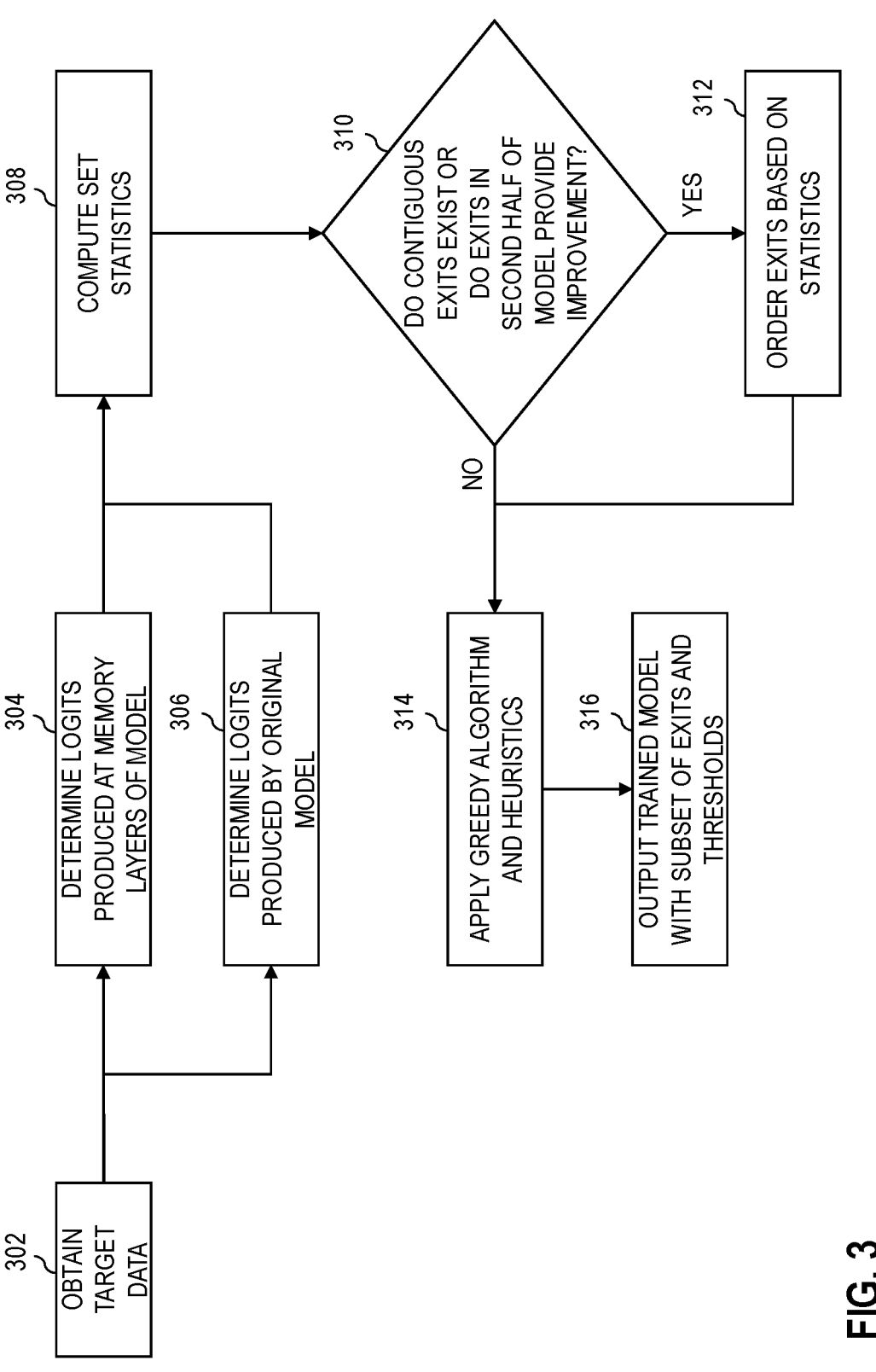
FIG. 3 is a diagram illustrating a diagnostic process in accordance with exemplary embodiments.

FIG. 3 is a diagram illustrating a diagnostic process in accordance with exemplary embodiments. Step 302 includes obtaining target data. Steps 304 and 306 include determining logits produced at each memory layer of a model 118 and produced by the original model, respectively. Step 308 includes computing a set of statistics 308. Step 310 is a test to determine whether there are contiguous exits in the model or whether exists in the second half of the model provide an improvement. If no, then the process continues directly to step 314. If yes, then the process continues to step 312 which includes ordering the exits based on the set of statistics. Step 314 includes applying a greedy algorithm and heuristics to the set of exits. Additionally, step 314 may also consider user defined parameters such as, for example, a specified number of exits to be used or an acceptable accuracy loss. Step 316 outputs: (i) the trained model with a subset of exits (that are dependent upon the target data) and (ii) the corresponding thresholds.

Figure 4:
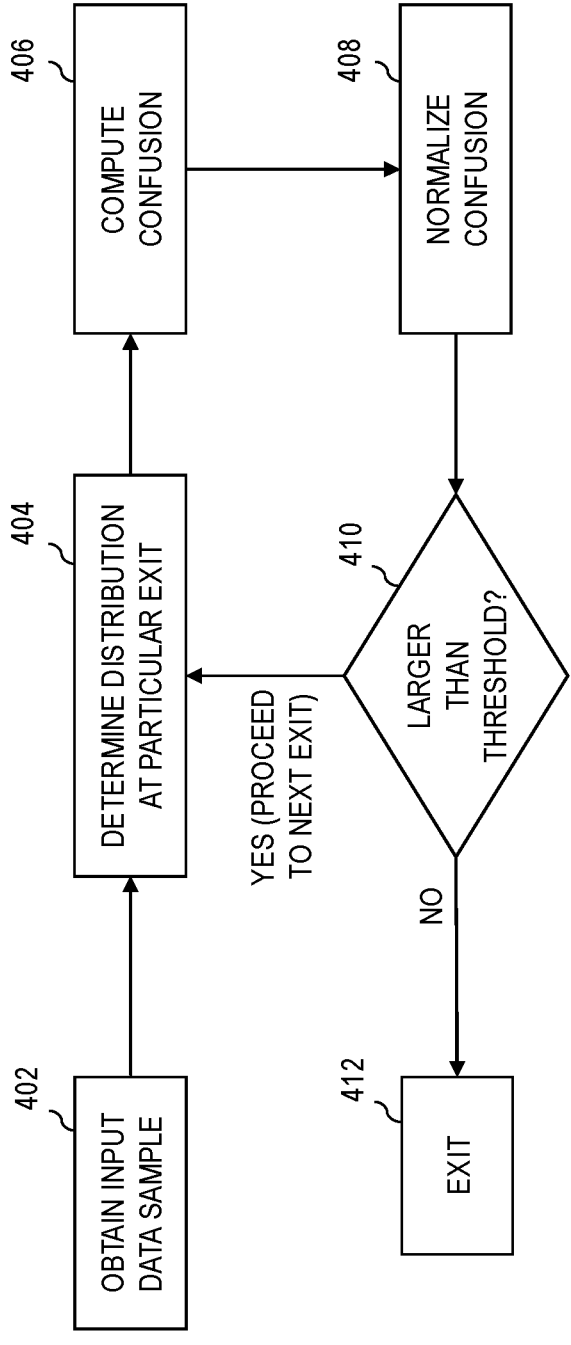
FIG. 4 is a diagram illustrating an exit layer process in accordance with exemplary embodiments.

FIG. 4 is a diagram illustrating an exit layer process in accordance with exemplary embodiments. Step 402 includes obtaining input data for a model with a set of early exits, and step 404 includes determining a distribution (e.g., a label, SoftMax, or probability distribution) that is produced at a particular exit of the model. Step 406 includes computing a confusion of the distribution, and step 408 includes normalizing the confusion. Step 410 includes a test that checks if the normalized confusion value from step 408 is larger than the exit threshold corresponding to the particular exit. If yes, then the process returns to step 404 for the next exit in the model. If no, step 412 includes using the particular exit for the input data sample.

FIG. 5 is a flow diagram illustrating techniques in accordance with exemplary embodiments. Step 502 includes determining a plurality of candidate exit points of a neural network model. Step 504 includes obtaining a plurality of outputs of the neural network model for data samples in a target dataset, wherein the plurality of outputs comprises early outputs of the neural network model from the plurality of candidate exit points and regular outputs of the neural network model. Step 506 includes selecting a set of one or more exit points from the plurality of candidate exits points for the target dataset based at least in part on the plurality of outputs.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 6:
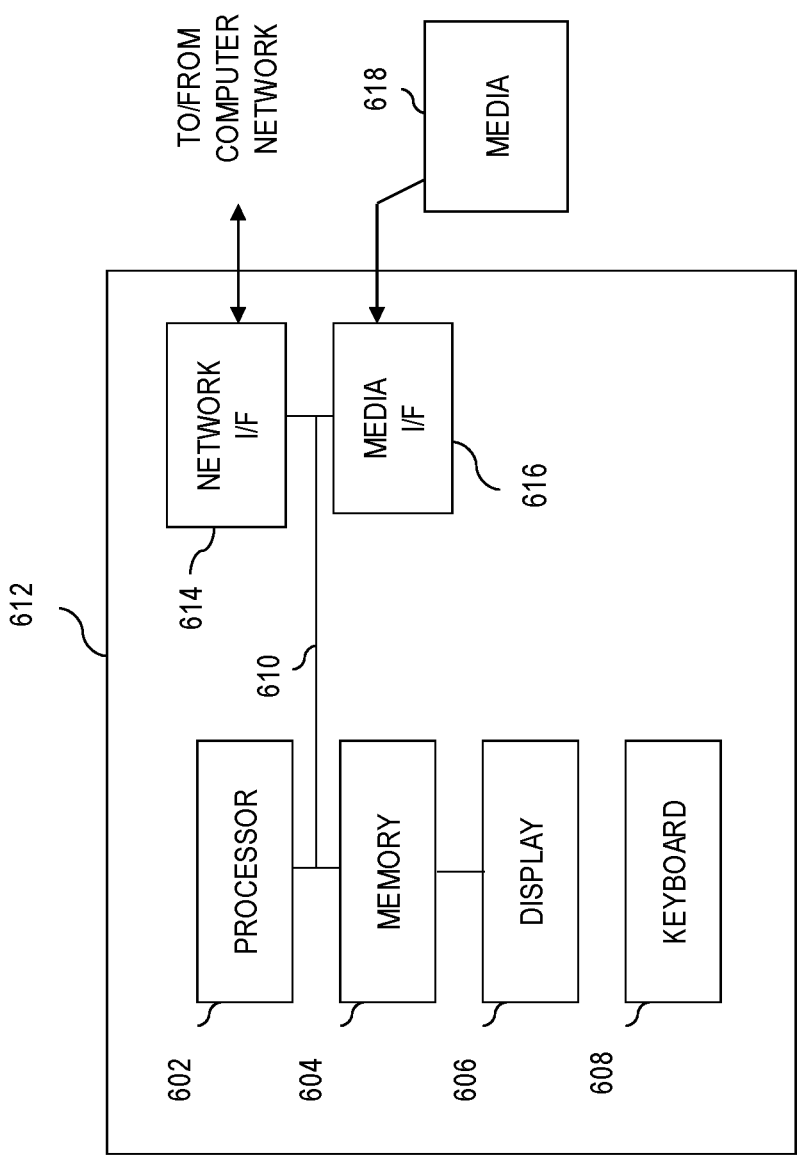
FIG. 6 is a system diagram of an exemplary computer system on which at least one embodiment of the present disclosure can be implemented.

Additionally, an embodiment of the present disclosure can make use of software running on a computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
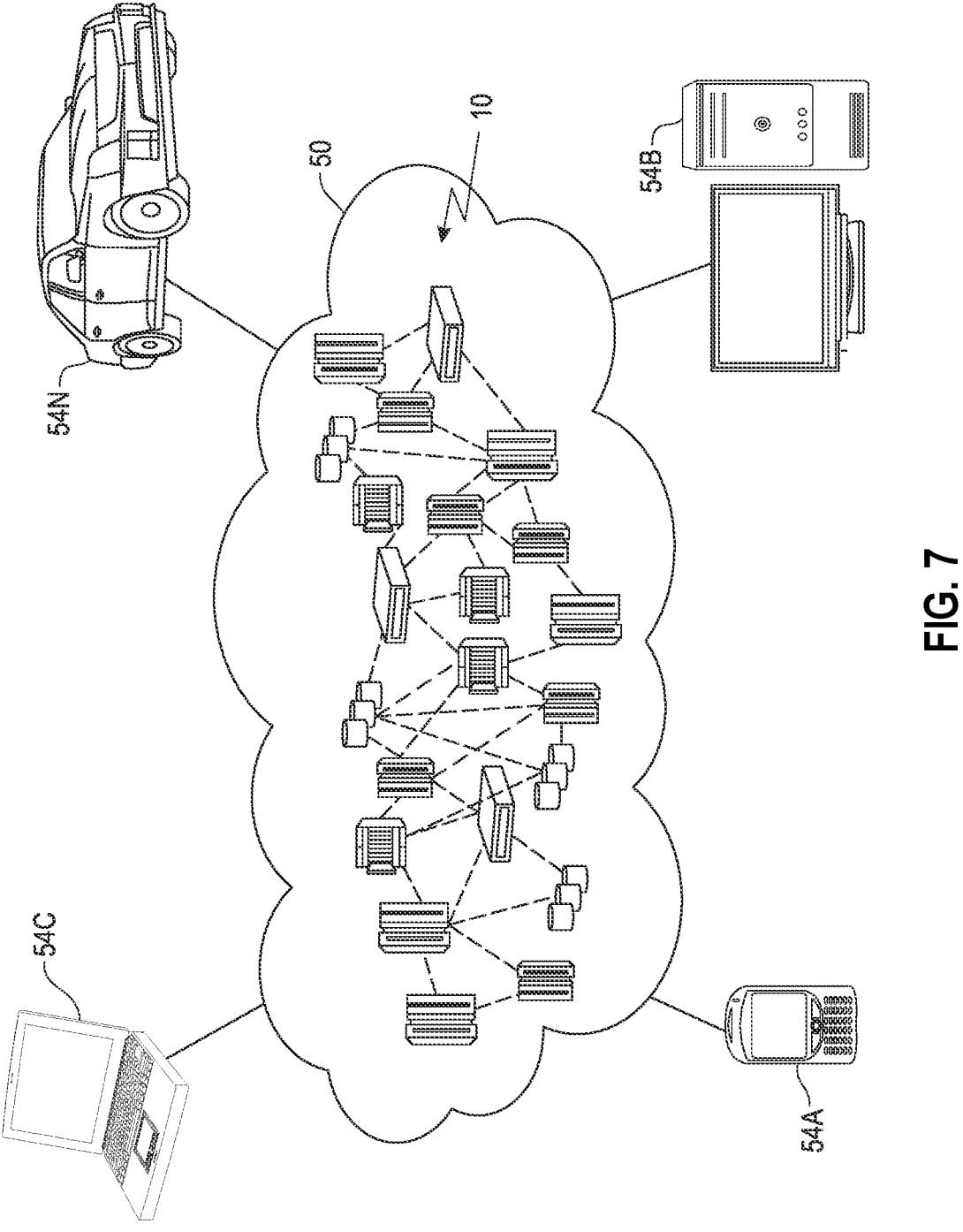
FIG. 7 depicts a cloud computing environment in accordance with exemplary embodiments.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
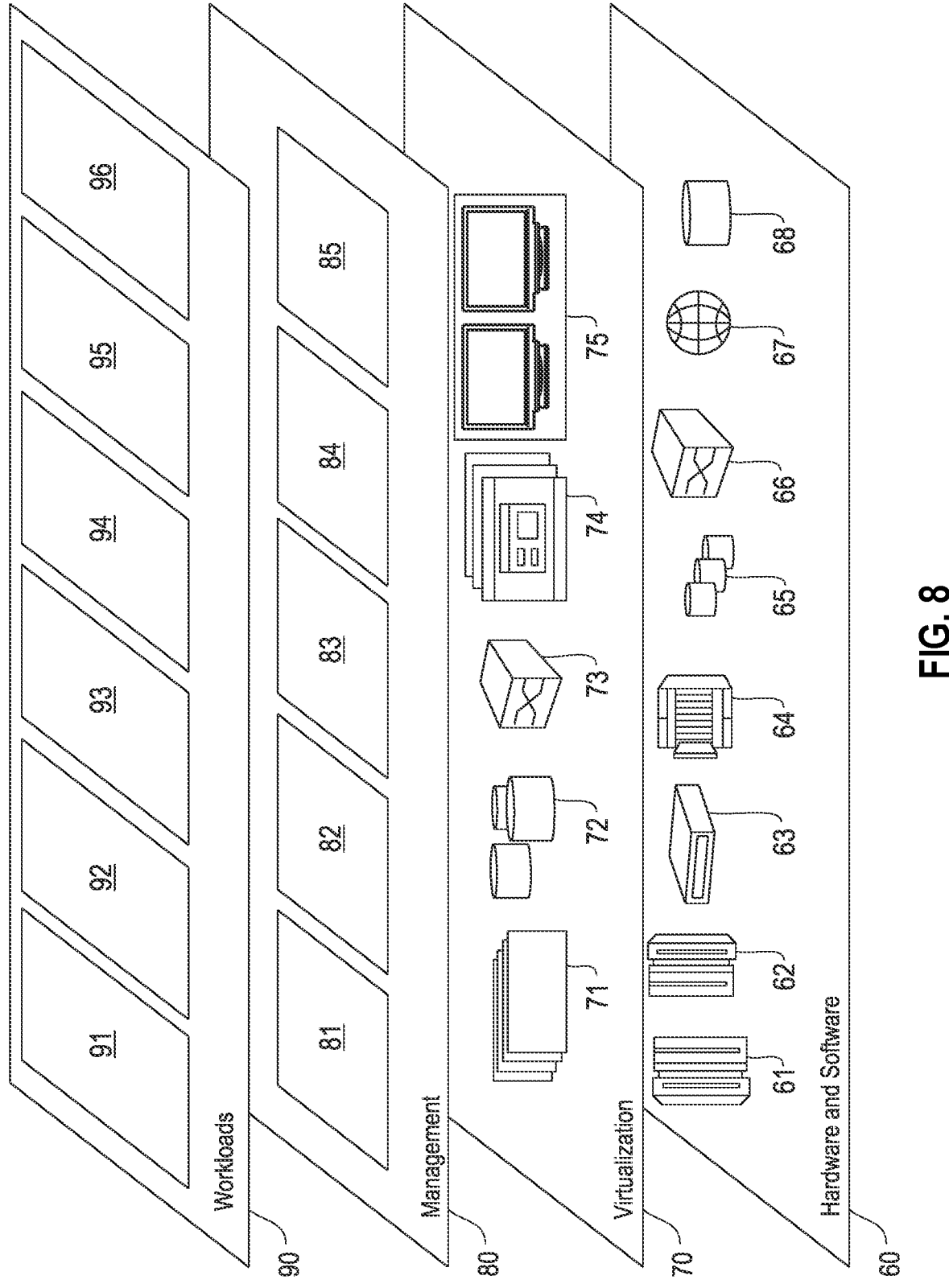
FIG. 8 depicts abstraction model layers in accordance with exemplary embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and accelerating inference of DNN models 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide a beneficial effect such as, for example, improving efficiency of model inference (e.g., with respect to computation and/or memory resources) while controlling the accuracy of model. By way of example, techniques described herein applied to a Bidirectional Encoder Representations from Transformers (BERT) model resulted in approximately twice as fast inference with a minimal drop in accuracy.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

determining a plurality of candidate exit points associated with respective layers of a neural network model;

processing, using the neural network model, one or more data samples in a target dataset to obtain a plurality of outputs, wherein the plurality of outputs comprises a first set of outputs of the neural network model from respective ones of the plurality of candidate exit points and a second set of outputs of the neural network model from a final layer of the neural network model;

storing the first set of outputs and the second set of outputs in one or more memory layers, integrated into an architecture of the neural network model;

performing a comparative analysis between the first set and the second set of outputs;

selecting a set of one or more exit points from the plurality of candidate exit points that are dependent on the target dataset based at least in part on the comparative analysis of the first set of outputs and the second set of outputs stored in the one or more memory layers of the neural network model, wherein selecting the set of one or more exit points is based at least in part on determination that two or more candidate exit points of the plurality of candidate exit points are contiguous exit points in the neural network model, wherein a first one of the contiguous exit points is associated with a first layer of the neural network model that provides an output directly to a second layer of the neural network model associated with a second one of the contiguous exit points; and processing, using the neural network model, one or more additional data samples in the target dataset based at least in part on the selected set of one or more exit points;

wherein the method is carried out by at least one computing device.

2. The computer-implemented method of claim 1, wherein selecting the set of one or more exit points comprises computing a set of statistics based on the first set of outputs and the second set of outputs.

3. The computer-implemented method of claim 2, wherein computing the set of statistics comprises at least one of:

applying a KL divergence technique;

applying a cross entropy technique; and determining whether at least one output in the first set is different than the at least one output in the second set for given ones of the data samples.

4. The computer-implemented method of claim 2, wherein selecting the set of one or more exit points comprises ranking the plurality of candidate exit points based on the set of statistics.

5. The computer-implemented method of claim 1, wherein selecting the set of one or more exit points comprises determining a threshold exit value for each exit point in the set.

6. The computer-implemented method of claim 1, wherein selecting the set of one or more exit points comprises training the neural network model using a modified loss function.

7. The computer-implemented method of claim 6, wherein training the neural network model is based on one or more user inputs.

8. The computer-implemented method of claim 6, wherein selecting the set of one or more exit points is based at least in part on a combination of exit-wise losses determined by the modified loss function.

9. The computer-implemented method of claim 7, wherein the one or more user inputs comprise at least one of:

a number of exits to be used in the neural network model;

a threshold change in accuracy of the neural network model;

one or more constraints on placement of the exits; and one or more computing constraints.

10. A computer program product comprising a computer readable storage medium having program instructions embodied therewith, the program instructions executable by a computing device to cause the computing device to:

determine a plurality of candidate exit points associated with respective layers of a neural network model;

process, using the neural network model, one or more data samples in a target dataset to obtain a plurality of outputs, wherein the plurality of outputs comprises a first set of outputs of the neural network model from respective ones of the plurality of candidate exit points and a second set of outputs of the neural network model from a final layer of the neural network model;

store the first set of outputs and the second set of outputs in one or more memory layers integrated into an architecture of the neural network model;

perform a comparative analysis between the first set and the second set of outputs;

select a set of one or more exit points from the plurality of candidate exit points that are dependent on the target dataset based at least in part on the comparative analysis of the first set of outputs and the second set of outputs stored in the one or more memory layers of the neural network model, wherein selecting the set of one or more exit points is based at least in part on determination that two or more candidate exit points of the plurality of candidate exit points are contiguous exit points in the neural network model, wherein a first one of the contiguous exit points is associated with a first layer of the neural network model that provides an output directly to a second layer of the neural network model associated with a second one of the contiguous exit points; and process, using the neural network model, one or more additional data samples in the target dataset based at least in part on the selected set of one or more exit points.

11. The computer program product of claim 10, wherein selecting the set of one or more exit points comprises computing a set of statistics based on the first set of outputs and the second set of outputs.

12. The computer program product of claim 11, wherein computing the set of statistics comprises at least one of:

applying a KL divergence technique;

applying a cross entropy technique; and determining whether at least one output in the first set is different than the at least one output in the second set for given ones of the data samples.

13. The computer program product of claim 11, wherein selecting the set of one or more exit points comprises ranking the plurality of candidate exit points based on the set of statistics.

14. The computer program product of claim 10, wherein selecting the set of one or more exit points comprises determining a threshold exit value for each exit point in the set.

15. The computer program product of claim 10, wherein selecting the set of one or more exit points comprises training the neural network model using a modified loss function.

16. The computer program product of claim 15, wherein training the neural network model is based on one or more user inputs.

17. The computer program product of claim 15, wherein selecting the set of one or more exit points is based at least in part on a combination of exit-wise losses determined by the modified loss function.

18. The computer program product of claim 16, wherein the one or more user inputs comprise at least one of:

a number of exits to be used in the neural network model;

a threshold change in accuracy of the neural network model;

one or more constraints on placement of the exits; and one or more computing constraints.

19. A system comprising:

a memory configured to store program instructions;

a processor operatively coupled to the memory to execute the program instructions to:

determine a plurality of candidate exit points associated with respective layers of a neural network model;

process, using the neural network model, one or more data samples in a target dataset to obtain a plurality of outputs, wherein the plurality of outputs comprises a first set of outputs of the neural network model from respective ones of the plurality of candidate exit points and a second set of outputs of the neural network model from a final layer of the neural network model;

store the first set of outputs and the second set of outputs in one or more memory layers integrated into an architecture of the neural network model;

perform a comparative analysis between the first set and the second set of outputs;

select a set of one or more exit points from the plurality of candidate exit points that are dependent on the target dataset based at least in part on the comparative analysis of the first set of outputs and the second set of outputs stored in the one or more memory layers of the neural network model, wherein selecting the set of one or more exit points is based at least in part on determination that two or more candidate exit points of the plurality of candidate exit points are contiguous exit points in the neural network model, wherein a first one of the contiguous exit points is associated with a first layer of the neural network model that provides an output directly to a second layer of the neural network model associated with a second one of the contiguous exit points; and process, using the neural network model, one or more additional data samples in the target dataset based at least in part on the selected set of one or more exit points.

20. The computer-implemented method of claim 1, wherein the set of one or more exit points is selected based at least on part on whether at least one candidate of the plurality of candidate exit points is located in a second half of the layers of the neural network model.

* * * * *